United States Patent [19]

Rainville

[11] 4,396,567

[45] Aug. 2, 1983

[54] METHOD FOR BLOW MOLDING WITH ACTIVE INGREDIENT IN BLOWING GAS

[76] Inventor: Dewey Rainville, 11 Kent Pl., Westfield, N.J. 07090

[21] Appl. No.: 269,513

[22] Filed: Jun. 1, 1981

Related U.S. Application Data

[62] Division of Ser. No. 97,805, Nov. 27, 1979, Pat. No. 4,336,015.

[51] Int. Cl.³ ...................... B29C 17/07; B29C 25/00
[52] U.S. Cl. ...................................... 264/83; 264/526; 264/538
[58] Field of Search ................... 264/37, 83, 523, 537, 264/538, 526; 425/73, 74, 210, 522, 533

[56] References Cited

U.S. PATENT DOCUMENTS

| | | | |
|---|---|---|---|
| 3,789,093 | 1/1974 | Bose | 264/528 X |
| 3,852,392 | 12/1974 | Davis et al. | 264/37 X |
| 3,862,284 | 1/1975 | Dixon et al. | 264/537 X |
| 3,999,911 | 12/1976 | Matsubara | 425/73 |

Primary Examiner—Jan H. Silbaugh
Attorney, Agent, or Firm—Hopgood, Calimafde, Kalil, Blaustein & Judlowe

[57] ABSTRACT

Articles, such as containers, can have their barrier properties improved either by using a small percentage of fluorine or other materials in the gas that is used at the blowing station of an injection blow molding machine. Some of these materials, such as fluorine, are a hazard to operators of the machine. This invention encloses the operational stations so that the blowing gas mixture cannot escape into the atmosphere of the shop where the blow molding machine is operating. An inert gas such as nitrogen is mixed with the fluorine gas, and the enclosing housing is purged when the machine is shut down at the end of a run.

1 Claim, 5 Drawing Figures

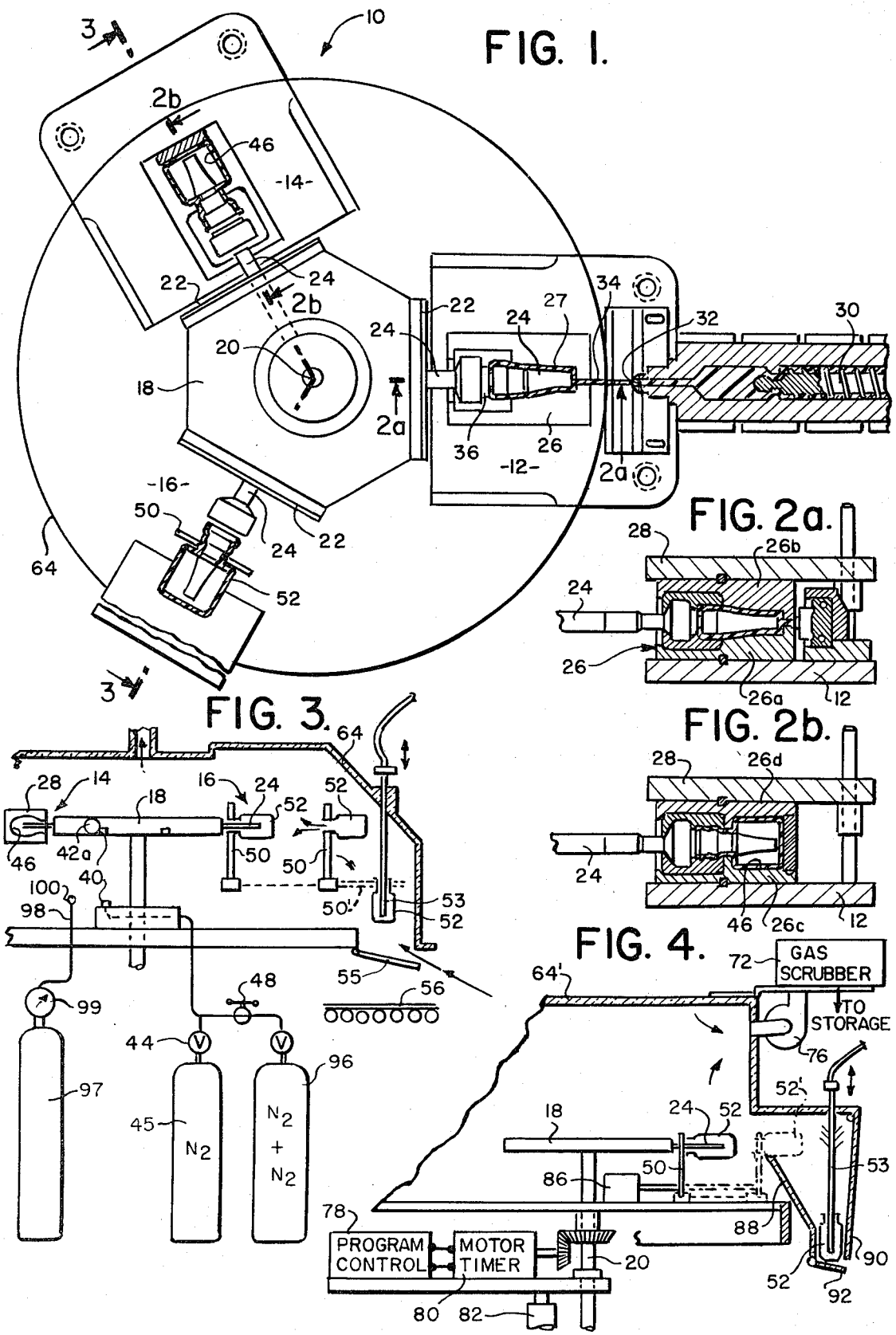

METHOD FOR BLOW MOLDING WITH ACTIVE INGREDIENT IN BLOWING GAS

RELATED CASE

This application is a division of copending application Ser. No. 097,805, filed Nov. 27, 1979, now U.S. Pat. No. 4,336,015.

PRIOR ART

Methods for producing extrusion blow molded thermoplastic articles having improved barrier properties are disclosed in U.S. Pat. No. 3,862,284, issued Jan. 21, 1975. Examples of gasses that can be mixed with the gas used for blowing containers are described; and so are the proportions for improved results in retaining solvents in the containers. U.S. Pat. No. 2,724,860 discloses blowing the parison while still in a molten state with a compressed fluid or blowing gas, to conform the parison with the contour of the surrounding mold cavity.

U.S. Pat. No. 2,811,468 discloses a method of treating polyethylene film and bottles that have been thoroughly cleaned with two percent fluorine and the balance nitrogen, air, freon and the like at temperatures not exceeding fifty degrees C. for a period of five minutes to three hours.

BACKGROUND AND SUMMARY OF INVENTION

The problem with which this invention is concerned is the protection of machine operators from the noxious gasses used to improve the barrier properties with certain types of blow molding machines. It is much more difficult to provide such protection in injection blow molding machines having successive operational stations angularly spaced around the axis of a table, in that core rods extend successively into molds at the angularly spaced operational stations around the axis of an intermittently indexible head that carries core rods, usually groups of core rods.

The process for making molded thermoplastic articles having improved barrier properties according to U.S. Pat. No. 3,862,284 does not make the blow molded articles by processes that have the large output of injection blow molding machines, and it is an object of this invention to use injection blow molding apparatus to reduce the cost of the articles of patent '284 by increasing the output of plastic containers having improved barrier properties and thereby reducing the unit cost. This invention converts an ordinary injection blow molding process, using successive operational stations, into an improved process for making containers having better barrier properties.

The principal object of the invention is to enclose the stations of an injection blow molding machine within a shielded region in which the stations are shut off from the working environment of machine operators. The finished containers are discharged from the molding machine, preferably after being flushed by nitrogen or other inert gas to eliminate most of the hazardous gas.

Other objects, features, and advantages of the invention will appear or be pointed out as the description proceeds.

DESCRIPTION OF PREFERRED EMBODIMENT

In the drawing, forming a part thereof, in which like reference characters indicate corresponding parts in all of the views:

FIG. 1 is a diagrammatic top plan view, partly in section, of an injection blow molding machine having, but not limited to, three operational stations providing visibility of the stations but shielding each station to prevent the operator from breathing fumes which may escape from successive stations;

FIGS. 2a and 2b are sectional views taken on the lines 2a—2a and 2b—2b, respectively, of FIG. 1;

FIG. 3 is a diagrammatic view with the gas shield of FIG. 1, taken on the section line 3—3 of FIG. 1 and with other parts shown in elevation and diagrammatically; and FIG. 4 is a diagrammatic view showing a modification of the structure of FIG. 3 and showing the way in which poisonous gas is purged from the blown containers.

DESCRIPTION OF PREFERRED EMBODIMENT

FIG. 1 is a plan view, partly in section, of a blow molding machine 10 having, but not limited to, three operational stations including an injection station 12, a blow station 14, and a stripper 16. An indexing head 18 rotates about a center 20. The indexing head 18 has three faces 22 which move intermittently through angles of 120° to bring core rods 24 into working relationship with the operational stations 12—14—16. Large molding machines have a plurality of cores extending from each face of the head 18 but for purposes of illustration only one core rod 24 is shown for each face 22.

The injection station 12 has an injection mode 26, best shown in FIG. 2a; in conjunction with a core rod 24, the cavity 27 of this mold is defined by and between a fixed mold section 26a which is secured to a fixed portion of the injection station 12, and an upper movable mold section 26b which is attached to a frame 28; frame 28 moves up and down to open the mold 26 whenever the core rod 24 is to be shifted from one operational station to the next.

Referring again to FIG. 1, a reciprocating or continuously rotating screw plasticizer 30 is movable in the direction of its length toward and from the mold 26 so as to bring the discharge end 32 of the plasticizer to the inlet end 34 of the mold 26 so that molten material from the plasticizer 30 can be discharged into the injection mold cavity 27; the cavity 27 is formed by a clearance between core rod 24 and cavity walls of mold sections 26a–26b, and cavity 27 is concentric with the axis of the mold. Molten plastic from the plasticizer 30 fills this cavity, which extends to a core rod neck ring 36.

When the mold 26 at the injection mold station opens, the indexing head 18 rises to lift the core rod 24 and its parison sufficiently to clear the lower mold section 26a (FIG. 2a) so the indexing head 18 can transport the core rod 24 to the next operational station, namely, the blowing station 14, where, after indexing head 18 moves downward, an upper mold section 26d (FIG. 2b) moves downward into contact with a lower mold section 26c to close the blow mold 26c–26d.

In addition to fluorine, other reactive gasses such as sulphur dioxide, carbon monoxide, carbon dioxide, chlorine, bromine, and mixtures of these gasses can be used in place of fluorine, though their effectiveness in improving the barrier properties of the material of the parison differ. In any event, the gas mixture can be prepared externally from the machine and maintained at an accurate level for the process, simplifying the blowing process.

As with conventional injection blow molding equipment, the walls of the blow mold should be maintained at relatively low temperature so that the plastic of the blown parison will harden quickly after making contact with the cavity wall of the blow mold. This is essential in order to maintain high production with injection blow molding machines because the blown article should be cooled to a solid state and removed (as a finished container 52) from the blow mold as soon as possible.

When the blow mold at station 14 opens and the head 15 indexes 120°, the core rod 24 and its blown parison are brought to the stripper station 16, where an upstanding stripper plate 50 first engages the container 52 at the container neck and then pushes it from the core rod 24. While holding container 52 by its neck, plate 50 next moves to the right in FIG. 3 and then displaces from upright to a horizontal position, as shown in dotted lines 50′, thereby placing the finished container 52 in an upright position. A purge tube 53 is lowered through the open top of the container 52, and a stream of nitrogen from the purge tube 53 displaces the fluorine from the container 52. Tube 53 also pushes the container 52 free of the stripper plate 50, allowing container 52 to fall on a spring loaded trap door 55. The weight of container 52 opens the door 55 so that the container 52 can fall clear of the molding machine and may be carried away by a conveyor 56.

FIG. 4 shows a modification of the stripper station already described in connection with FIG. 3. In FIG. 4, the plate 50 moves container 52 toward the right, and the plate 50 remains vertical. Instead of rotating through an angle of 90° as in FIG. 3, the plate 50 of FIG. 4 moves the container 52 across a baffle 88. When the plate 50 has reached the limit of its travel, the container 52 is positioned, as shown in dotted lines 52′ in FIG. 4, with the shoulder of the container beyond the top of the baffle 88.

A motor 86 reverses the direction of movement of the plate 50 so that the plate moves toward the left in FIG. 4. The upper end of the baffle 88 holds the container 52 against movement when plate 50 starts its return movement toward the left, and this causes plate 50 to disengage from the neck of the container 52. The container slides down the baffle 88 into a well 90 which is slightly larger in cross section than the container 52, and is thereby reoriented, with its neck up and on a vertical axis, as shown in FIG. 4. The tube 53 then descends, as in FIG. 3, and into the interior of the container 52, and a blast of nitrogen from the tube 53 flushes out the noxious gas from the container 52′, the nitrogen blast also exerts a downward force on the container and thereby causes a trap door 92, under the container, to open and permit the container to fall by gravity onto a conveyor or chute or into a large shipping box.

It will be understood that a program control 78 controls a motor 80 which intermittently rotates the indexing head 18 and also controls a motor 82 which raises and lowers the indexing head 18 in accordance with the cycle of the machine.

If the poisonous gas is not removed from the blown parison (container 50) at the blowing station, there are two other methods by which the container can be purged of poisonous gas, without need for purging each cycle; these two other methods are a result of scrubber action, as will later appear.

It is a feature of the invention that a housing or cover, preferably transparent, shall cover the head 18 and all of the operational stations 12—14—16. In FIGS. 1 and 3, this housing is identified 64, and in the modification of FIG. 4 it is identified 64′.

A gas scrubber 72 removes gas from the space enclosed by the housing 64 (64′), in the event of any leakage of gas within the housing 64 (64′). Any hazardous gas that escapes at the blow station or the stripper station is confined under the housing 64 (64′) and is eventually carried to the gas scrubber 72 by a blower 76.

In the apparatus and process of this invention, it is not necessary to purge the apparatus after each blowing operation. The treating gas in the blow gas system can remain in the system all the time that the apparatus is running. The purging for hazardous gas from the hood formed by the housing 64 (64′) that enclose the operational stations can be done when the apparatus is shut down. It can be done manually by simply cutting off the blow gas supply and turning on a burst of nitrogen.

In an invention of this kind, there are occasional leaks in the system, as when a hole is accidentally blown in a container. The gas which escapes from the ruptured container flows into the immediate area which is enclosed by the housing 64 (64′). This housing is an enclosure but it is ordinarily not sealed. The fluorine gas is controlled by the fact that blower 76 (FIG. 4) which pulls air from the housing enclosure creates a negative pressure in the enclosure so that air comes into the area wherever there might be a leak in the housing 64. This keeps the flourine from getting out.

In order to prevent too much air from entering the enclosure and requiring the use of a much larger scrubber, due to oxygen from the ambient atmosphere, it is preferable to meter in a small flow of nitrogen to cut down on air leakage into the housing 64. This lowers the humidity in the area because the dew point of nitrogen is −200° F.; a lower temperature is maintained within the housing 64 (64′) because the nitrogen is so cold.

The scrubber is supported from the housing 64 (64′) or it may be remotely mounted; it discharges to the atmosphere after cleaning the air.

The housing 64 (64′) is actually a guard that must be raised to work on or set up molds. When the apparatus is running, the housing 64 (64′) rests on a gasket on top of a table that extends under all the operational stations of the machine.

What is claimed is:

1. The method of improving barrier properties of the walls of injection blow-molded plastic containers, which method comprises applying a parison to a core rod by injection-molding at an injection station, transferring the core rod and the parison to a blowing station, blowing through the core rod and into the parison a mixture of an inert gas and a hazardous gas that reacts with the material of the parison to improve the barrier properties of the material of the parison, such blowing of the parison being to the dimensions of the blowing mold, cooling the blowing mold and the material of the blown parison in the blowing mold, enclosing at least the blowing mold and a stripper station in a housing that isolates from ambient atmosphere an enclosed volume of space which includes the blowing mold and the stripper station, continuously subjecting the enclosed volume to negative pressure by exhaust-pumping gas mixture from within said volume and scrubbing the exhaust-pump mixture, transferring the core rod and its blown parison from the blowing station to the stripping station, stripping the blown parison from the core rod to thereby deliver a stripped container at the stripping station, supporting the stripped container in a predetermined orientation at the stripping station, venting mixture into the housing from the supported stripped container by discharging a purging gas into the stripped container, and removing the purged container from the housing.

* * * * *